US012346459B1

(12) United States Patent
Medioni et al.

(10) Patent No.: US 12,346,459 B1
(45) Date of Patent: Jul. 1, 2025

(54) SYSTEM FOR DETERMINING STORAGE PARAMETERS FOR BIOMETRIC DATA

(71) Applicant: AMAZON TECHNOLOGIES, Inc., Seattle, WA (US)

(72) Inventors: Gerard Guy Medioni, Los Angeles, CA (US); Igor Kviatkovsky, Haifa (IL); Alon Shoshan, Haifa (IL); Nadav Israel Bhonker, Talmei Elazar (IL); Shunit Haviv Hakimi, Haifa (IL); Oron Anschel, Bethlehem of Galiee (IL); Jordan Tyler Williams, San Francisco, CA (US); Manoj Aggarwal, Seattle, WA (US); Dilip Kumar, Seattle, WA (US); Adam Botach, Haifa (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 486 days.

(21) Appl. No.: 17/933,448

(22) Filed: Sep. 19, 2022

(51) Int. Cl.
  G06F 21/00 (2013.01)
  G06F 21/60 (2013.01)
  G06V 40/10 (2022.01)

(52) U.S. Cl.
  CPC .......... *G06F 21/602* (2013.01); *G06V 40/117* (2022.01); *G06F 2221/2107* (2013.01)

(58) Field of Classification Search
  None
  See application file for complete search history.

(56) References Cited

U.S. PATENT DOCUMENTS 11,411,733 B1 * 8/2022 Dailey ................. H04L 9/3226
11,436,344 B1 * 9/2022 Juch ....................... G06F 16/215
11,520,907 B1 * 12/2022 Borowiec ............... G06F 3/067
(Continued)

OTHER PUBLICATIONS

Thapaliya et al. Machine Learning-based Vulnerability Study of Interpose PUFs as Security Primitives for IoT Networks. 2021 IEEE International Conference on Networking, Architecture and Storage (NAS). https://ieeexplore.ieee.org/stamp/stamp.jsp?tp=&arnumber=9605405 (Year: 2021).*

(Continued)

*Primary Examiner* — Jeremiah L Avery
(74) *Attorney, Agent, or Firm* — Lindauer Law, PLLC

(57) ABSTRACT

A biometric identification system may store biometric data for later assessment. Data storage parameters, such as cryptographic keys used to encrypt and decrypt the biometric data, may be determined based on the biometric data. In one implementation, the biometric data comprises embedding data in an embedding space. During enrollment and storage, the embedding data is assessed to determine nearest anchor data in the embedding space. Cryptographic parameters, such as an encryption key, are determined based on "k" anchor data that are within a threshold distance of the embedding data in the embedding space. During query, query embedding data is similarly processed to determine cryptographic parameters, such as a decryption key. The decryption key may then be used to attempt decryption of the encrypted at-rest biometric data. If successful, the decrypted biometric data may then be compared to the query embedding to assert an identity.

20 Claims, 6 Drawing Sheets

(56) References Cited

U.S. PATENT DOCUMENTS

| | | | | |
|---|---|---|---|---|
| 11,809,603 | B2* | 11/2023 | Scillieri | H04L 9/3073 |
| 11,899,658 | B1* | 2/2024 | Bhushan | G06F 16/955 |
| 11,934,322 | B1* | 3/2024 | Miller | G06F 3/061 |
| 2022/0294816 | A1* | 9/2022 | Martin | H04L 67/535 |
| 2022/0321340 | A1* | 10/2022 | Tsitrin | H04L 9/0838 |
| 2022/0382885 | A1* | 12/2022 | Durham | G06F 12/0646 |
| 2022/0382915 | A1* | 12/2022 | Thomsen | G06F 21/602 |
| 2022/0398340 | A1* | 12/2022 | Jakobsson | H04L 9/30 |
| 2022/0414536 | A1* | 12/2022 | M L | H04L 9/14 |
| 2023/0083642 | A1* | 3/2023 | Saginawa | G06F 21/6245 |
| | | | | 726/27 |
| 2023/0104102 | A1* | 4/2023 | Benson | G06F 9/54 |
| | | | | 380/28 |
| 2023/0107763 | A1* | 4/2023 | Ott | H04L 9/0618 |
| | | | | 713/189 |
| 2023/0109647 | A1* | 4/2023 | Ott | H04L 9/0618 |
| | | | | 713/189 |
| 2023/0259640 | A1* | 8/2023 | Metzler | G06F 21/6218 |
| | | | | 713/191 |
| 2024/0070295 | A1* | 2/2024 | Kwok | G06F 21/602 |

OTHER PUBLICATIONS

Allam, Ahmed M. et al. Security analysis of neural cryptography implementation. 013 IEEE Pacific Rim Conference on Communications, Computers and Signal Processing (PACRIM). https://ieeexplore.ieee.org/stamp/stamp.jsp?tp=&arnumber=6625473 (Year: 2013).*

O'Brien, Richard C.; Payne Jr, Charles N. Virtual Private Groups for Protecting Critical Infrastructure Networks. 2009 Cybersecurity Applications & Technology Conference for Homeland Security. https://ieeexplore.ieee.org/stamp/stamp.jsp?tp=&arnumber=4804433 (Year: 2009).*

Berg, Michael J., "Indirection and Computer Security", Sandia National Laboratories, Sep. 2011, 32 pgs. Retrieved from the Internet: URL: https://digital.library.unt.edu/ark:/67531/metadc835605/m2/1/high_res_d/1034885.pdf.

* cited by examiner

SYSTEM FOR DETERMINING STORAGE PARAMETERS FOR BIOMETRIC DATA

BACKGROUND

Biometric data may be stored and used to assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
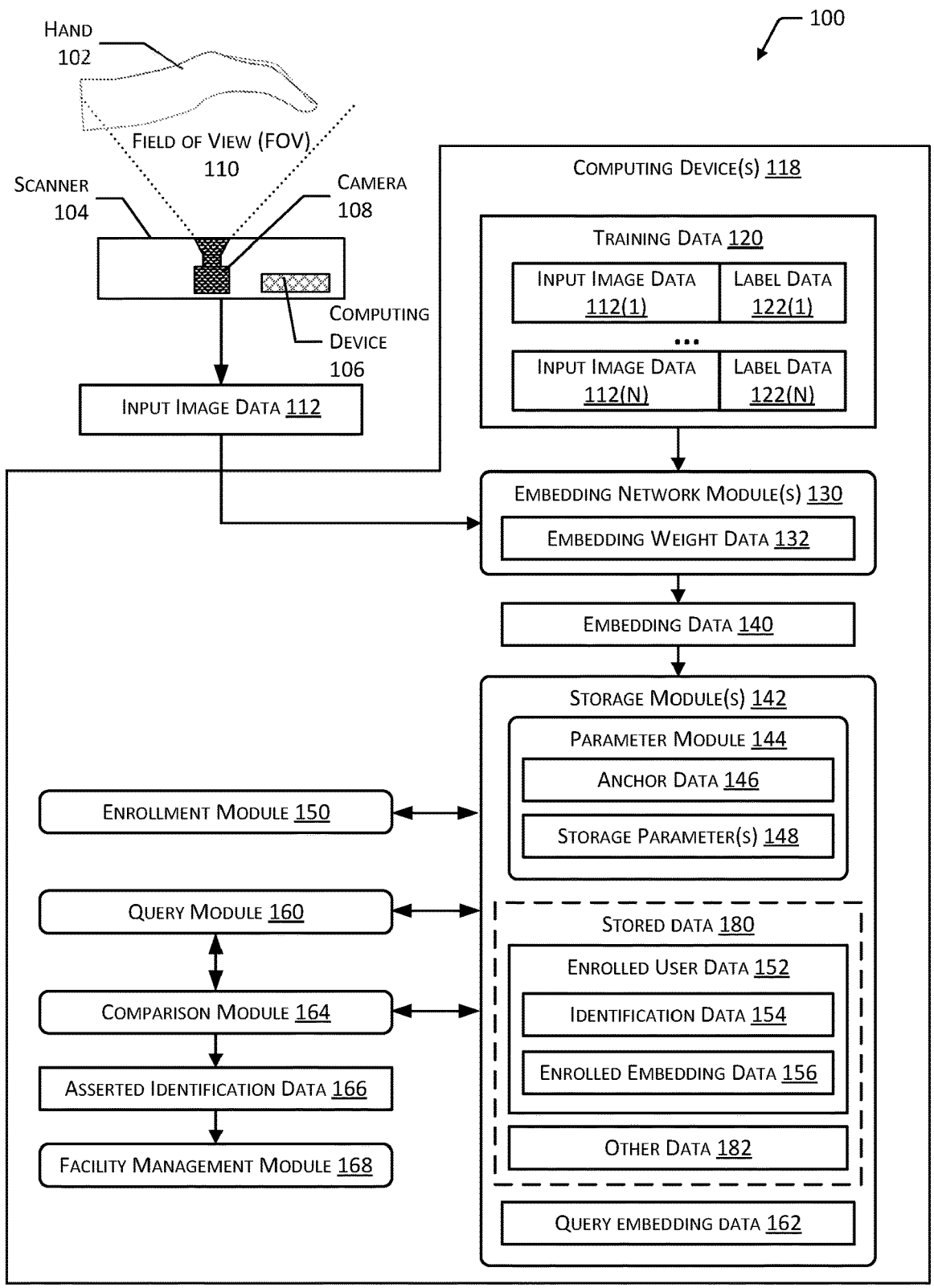
FIG. 1 illustrates a system to determine storage parameters for at rest biometric data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A biometric identification system offers substantial advantages in many situations. For example, the ability to accurately identify a user at a point of sale allows for quick and convenient payment processing without the need for the user to present a credit card, smart phone, or other physical token. In another example, accurate biometric identification improves physical access by unlocking a door to allow a particular person to enter a controlled area.

The biometric identification system utilizes biometric input data during operation. This input data is used to enroll users, during subsequent queries to identify users, and so forth. Because the input data, or information derived from the input data, contains information that may be deemed to be private by users, legal entities, and so forth, the information therein must be safeguarded from impermissible access. Several different techniques may be used to secure this information. For example, input data "in motion" that is being transmitted from the scanner to a server may be encrypted using cryptographic keys associated with those devices. Once at the server, input data (or information based thereon) that is "at rest" is stored for later use. For example, once a user has enrolled to use a biometric identification system the input data (or information based on the input data) that is associated with that user may be stored "at rest" for later retrieval. While "at rest" the input data or information based on the input data may be encrypted.

Traditional techniques for securing at rest data include having all stored data encrypted using a common cryptographic key. While straightforward, a drawback of this technique is that any compromise of that common cryptographic key has the potential to expose all of the data encrypted with that compromised common cryptographic key.

Described in this disclosure are techniques and systems that may be used to process input data to determine storage parameters. These storage parameters may then be used to improve the security of stored information, such as at rest biometric input data. The data storage parameters may include one or more of cryptographic keys, data storage address(es), and so forth. For example, the cryptographic keys may comprise a symmetric key, a public key, a private key, and so forth. In another example, the data storage address may indicate a storage location in persistent memory where data may be stored.

In one implementation a biometric identification system may process input data to determine embedding data that is representative of features in the input data. For example, an embedding neural network may be trained to process an input image and generate input embedding data that represents the features in the input image as a vector in an embedding space. The input embedding data may be assessed with regard to previously stored anchor data to determine one or more storage parameters, such as cryptographic keys, that are used to encrypt the input data. For example, a plurality of instances of synthetic or simulated input data may be processed by the embedding neural network to determine a plurality of instances of anchor embedding data that are within the embedding space. Continuing the example, with respect to the input embedding data, a set of top k closest anchor embeddings may be determined. In this example, k is a positive non-zero integer. For example, if k=3 then the three anchor embeddings that are closest to the input embedding are determined.

Once determined, the set of top k anchor embedding data may be used to determine the one or more storage parameters. For example, the top k anchor embeddings may be used as inputs to derive a cryptographic key. This cryptographic key may then be used to encrypt the stored input data while at rest.

At a later time, the encrypted stored input data may be decrypted by determining the embedding data associated with the encrypted stored input data. Based on the embedding data the top k anchor embeddings may be determined and used to derive the cryptographic key. The cryptographic key may then be used to decrypt the encrypted stored input data for further processing.

The anchor embeddings used may be changed at a later time and stored input data migrated to use storage parameters associated with the new anchor embeddings. For example, a second set of anchor embedding data may be determined. The stored input data may be accessed using the prior first set of anchor embedding data and then stored using the storage parameters associated with the second set of anchor embedding data.

By using the techniques described in this disclosure, a substantial improvement in the security of at rest data is realized. In the extremely unlikely event of a compromise to a particular storage parameter such as a cryptographic key or data storage address, only a very small subset of the stored data is subject to compromise.

Illustrative System

FIG. 1 illustrates a system 100 to determine storage parameters for at rest data such as biometric data, according to some implementations. The system 100 is described as being used to improve security and facilitate the management of data used as part of a biometric identification system that determines an identity of a user. However, the system and techniques described herein may be used to store other data in other situations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation, the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. In some implementations, images may be acquired using different combinations of polarized or unpolarized light provided by the infrared lights.

The images produced by the scanner 104 may be of first modality features, second modality features, or both. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of unpolarized light or polarized light provided by infrared lights. In one implementation, the input image data 112 comprises first modality image data and second modality image data. The first modality image data and the second modality image data of the same object may be acquired in rapid succession with respect to one another. For example, the camera 108 may operate at 60 frames per second and acquire the first modality image data in a first frame and the second modality image data in a second frame. In another implementation, the input image data 112 may comprise a single multi-modal image that includes at least some features present in both the first modality and the second modality. For example, the hand 102 may be illuminated with unpolarized or randomly polarized infrared light, and the camera 108 may include an infrared optical bandpass filter in the optical path. The resulting input image data 112 may include surface and subcutaneous features.

In the implementation depicted here, the scanner 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

Training data 120 may comprise input image data 112, such as input image data 112 acquired using one or more modalities. For example, the training data 120 may comprise first modality image data, second modality image data, multi-modal image data, and so forth. The input image data 112 in the training data 120 may be associated with label data 122. For example, the label data 122 may be indicative of modality, identity, and so forth.

The training data 120 may comprise one or more of actual input data with associated label data 122 or synthetic input data with associated label data 122. The actual input data may comprise actual input image data 112 that has been acquired from individuals who have opted in to provide training data 120. In one implementation, the training data 120 may exclude individuals who have enrolled to use of the system for identification. In another implementation, some enrolled users may opt in to explicitly permit input image data 112 obtained during enrollment to be stored as actual input data for later training.

An embedding network module 130 includes an embedding network model that is trained using the training data 120 to determine embedding data 140. The embedding network model may comprise a neural network or other machine learning system that, during training, determines embedding weight data 132. The embedding weight data 132 may comprise weight values, bias values, or other values associated with operation of nodes within the machine learning system of the embedding network model. Due to the variability involved in the training process, even using the same training data 120 and same architecture of embedding network model, different trained embedding network modules 130 will have different embedding weight data 132, and thus produce different embedding data 140 as output given the same input image data 112.

The embedding data 140 is representative of at least some of the features represented in the input, such as the input image data 112. The embedding data 140 may comprise a vector value in an embedding space. The embedding space is particular to the embedding network module 130 used to generate the embedding data 140.

In some implementations, the system 100 may use one or more initial filter module(s) (not shown) to assess input data such as the input image data 112 before further processing.

In some implementations (not shown), the system 100 may comprise a plurality of embedding network modules 130(N) that accept input image data 112, or other data based on the input image data 112, and determine respective embedding data 140 in a respective embedding space. One or more techniques may be used to determine or translate the embedding data 140 from a given embedding network module 130(N) into a common embedding space. In one implementation, individual embedding network modules 130(N) may be associated with respective translator modules (not shown). Each of the translator modules may comprise a neural network or other machine learning system that, during training, determines translator weight data. The translator weight data may comprise weight values, bias values, or other values associated with operation of nodes within the machine learning system of the embedding network model. Each translator module is trained to accept the embedding data 140 generated by a particular embedding network module 130 and produce as output translated embedding data. The translator modules are trained such that the translated embedding data is within a common embedding space. In such implementations the embedding data 140 may comprise the translated embedding data.

One or more storage modules 142 may be used to perform various data storage and retrieval operations associated with stored data 180. The storage module 142 may include a parameter module 144 to determine one or more storage parameters 148 associated with the stored data 180. During operation, the parameter module 144 accepts input such as one or more of the input data (such as input image data 112), embedding data 140, and so forth. The parameter module 144 also accesses anchor data 146. The anchor data 146 comprises information indicative of one or more anchor embeddings or other information associated with the embedding space. In one implementation, the anchor data 146 may comprise embedding data determined by processing at least a portion of the training data 120. In some implementations, the anchor data 146 may comprise a subset that provides a specified distribution throughout the embedding space.

The storage parameters 148 may comprise one or more of cryptographic keys, data storage addresses, data storage tokens, and so forth. For example, the cryptographic keys may comprise an encryption key used to encrypt data, decryption key used to decrypt the encrypted data, and so forth. In another example, the data storage addresses may specify a memory location (such as a virtual or physical address), index value, and where the stored data 180 is or will be stored. In another example, the data storage token may comprise a tokenized value that is used to retrieve the stored data 180. The tokenized value may comprise a pointer or reference that has no extrinsic or exploitable meaning, in that it does not encode specific information.

By using the parameter module 144 to determine the storage parameters 148, a substantial improvement in the security of at rest data is realized. In the extremely unlikely event of a compromise to a particular storage parameter 148, such as a cryptographic key or data storage address, only a very small subset of the stored data is subject to compromise. Operation of the storage modules 142 is discussed in more detail with regard to FIGS. 2-6.

Users are able to utilize the system 100 by performing an enrollment process. An enrollment module 150 may coordinate the enrollment process. Enrollment may associate biometric information, such as input image data 112, embedding data 140, and so forth with particular information such as a name, account number, and so forth.

During an enrollment process, the user opts in and presents their hand 102 to the scanner 104. The scanner 104 provides input image data 112 to a computing device 118. The computing device 118 may include one or more of the trained embedding network modules 130. The scanner 104 may encrypt and send the input image data 112 or data based thereon to another computing device 118 such as a server. For example, the input image data 112 may be processed to determine a representation of the input image data 112, such as using an encoder of a variational autoencoder backbone to determine secondary data that is representative of the input image data 112.

In some implementations, users who opt in to provide training data 120 may have their input image data 112 retained. In some implementations, input image data 112 or other information based thereon, such as secondary data, may be retained using the techniques described herein. For example, the parameter module 144 may be used to determine the storage parameters 148 comprising a cryptographic key(s) that is used to encrypt the input image data 112 while at rest in the stored data 180.

During the enrollment process, the submitted embedding data 140 may be checked to determine whether the user has been previously enrolled. For example, the comparison module 164 described below may be used. A successful enrollment may comprise storage of enrolled user data 152 comprising identification data 154, such as name, telephone number, or account number, enrolled embedding data 156, and so forth. In some implementations, the enrolled user data 152 may comprise additional information associated with processing of the input image data 112 with an embedding network module 130. For example, the enrolled user data 152 may comprise intermediate layer data, such as the values of a penultimate layer of the embedding network module 130, secondary data, and so forth.

During subsequent usage, such as at a second time, the (as yet unidentified) user presents their hand 102 at a scanner 104. The resulting query input image data 112 may be processed using the embedding network module 130 to determine query embedding data 162 that is provided to a comparison module 164.

The comparison module 164 compares the query embedding data 162 to the enrolled embedding data 156 stored in the enrolled user data 152 to determine asserted identification data 166. In one implementation, the asserted identification data 166 may comprise a user identifier associated with the closest previously stored embedding data 140 in the enrolled user data 152 to the query embedding data 162 associated with the user who presented their hand 102. The comparison module 164 may utilize other considerations, such as requiring that the query embedding data 162 is no more than a maximum distance in the embedding space from the enrolled embedding data 156 of a particular user before determining the asserted identification data 166. During operation of the comparison module 164, the storage module 142 and the parameter module 144 may be used to determine storage parameters 148 associated with retrieval of the stored data 180. For example, based on the query embedding data 162, the parameter module 144 may determine storage parameters 148 such as a data storage address, decryption keys, and so forth that are then used to access at least a portion of the stored data 180.

The asserted identification data 166 may then be used by subsequent systems or modules. For example, the asserted identification data 166, or information based thereon, may be provided to a facility management module 168.

The facility management module 168 may use the asserted identification data 166 to associate an identity with that user as they move about a facility. For example, the facility management module 168 may use data from cameras or other sensors in the environment to determine a location of the user. Given a known path of the user from an entrance that utilizes the scanner 104, the user identity indicated in the identification data 154 may be associated with the user as they use the facility. For example, the now identified user may walk to a shelf, remove an item, and leave the facility. The facility management module 168 may determine the interaction data indicative of the removal of the item as being associated with the user identifier specified in the asserted identification data 166, and bill an account associated with the user identifier. In another implementation, the facility management module 168 may comprise a point of sale system. The user may present their hand 102 at checkout to assert their identity and pay using a payment account that is associated with their identity.

The systems and techniques described above are discussed with respect to image data of human hands. These systems and techniques may be used with respect to other forms of data, other kinds of objects, and so forth. For example, these techniques may be used for facial recognition systems using image data of a face, audio data, object recognition systems, and so forth.

Figure 2:
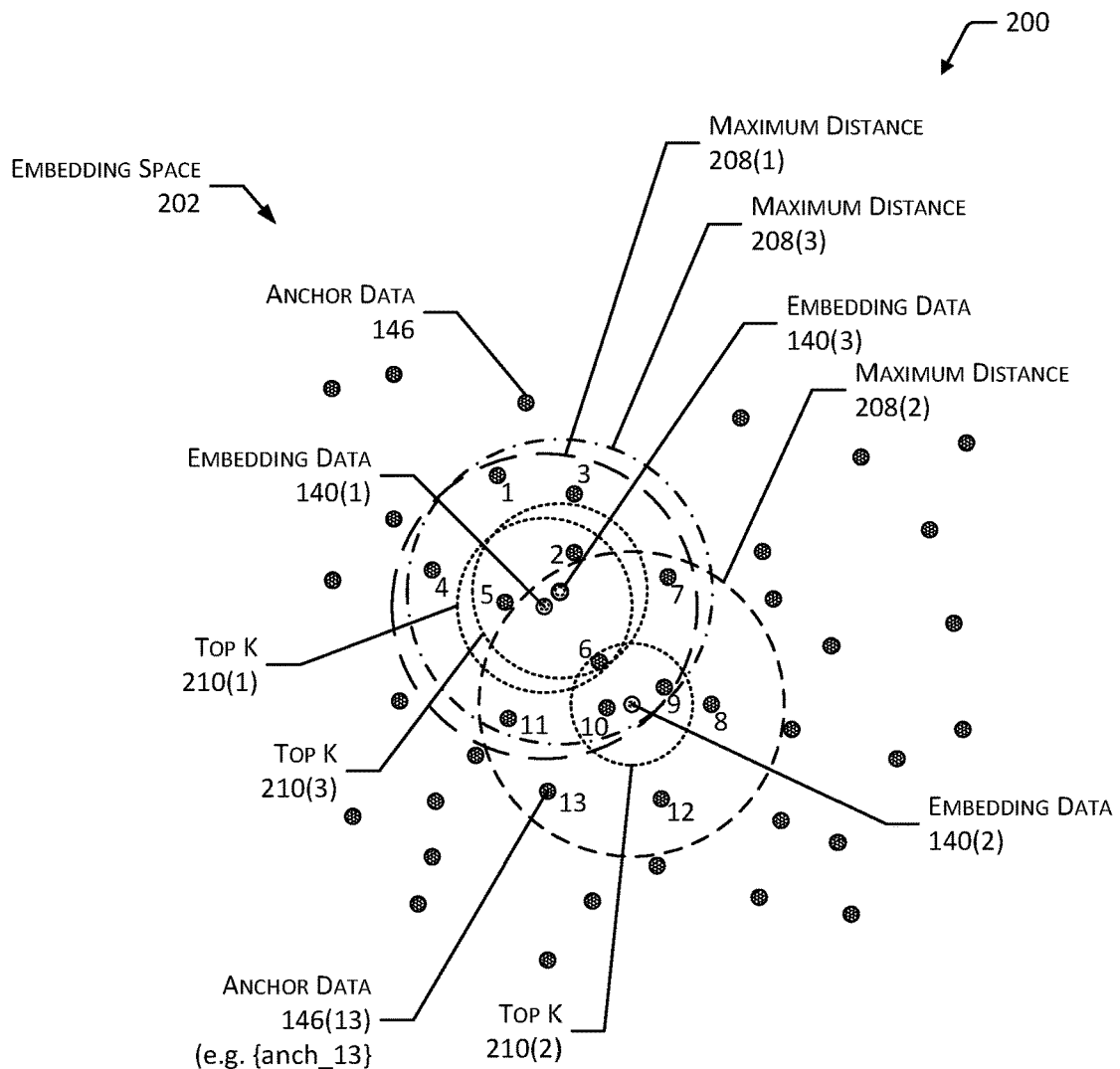
FIG. 2 illustrates an embedding space and a block diagram of storage parameters, according to some implementations.

FIG. 2 illustrates at 200 an embedding space 202 and a block diagram of storage parameters 148, according to some implementations. For ease of illustration and not as a limitation, embedding space 202 is depicted as having two dimensions. During actual operation, the embedding data 140 may comprise vectors within an n-dimensional space. For example, the embedding space 202 may exceed 500 dimensions.

Depicted are discrete instances of anchor data 146 in the embedding space 202. The distribution, relative position, and so forth, in the embedding space 202 may be constrained or unconstrained. For example, the anchor data 146 may be specified such that a minimum distance between adjacent embeddings of anchor data 146, maximum distance, and so forth is provided. In other implementations, the anchor data 146 may be placed at regular, periodic, or otherwise deterministic intervals within the embedding space 202.

Also depicted are the positions in the embedding space 202 of three instances of embedding data 140(1), 140(2), and 140(3). During operation of the parameter module 144, a maximum distance 208 may be specified. The maximum distance 208 may indicate a maximum distance with respect to the embedding space 202 within which anchor data 146 will be considered while determining storage parameters 148 for a specified instance of embedding data 140. In the implementation shown, the maximum distance 208 is fixed for the three instances of embedding data 140(1)-(3).

During operation, the parameter module 144 may determine information about the anchor data 146 with respect to an instance of the embedding data 140. In one implementation the parameter module 144 may determine a top k set of instances of anchor data 146 with respect to a specified instance of embedding data 140. In some implementations, k may comprise a positive nonzero integer value.

In the example depicted, embedding data 140(1) and embedding data 140(3) are relatively close to one another in the embedding space 202. However, even the slight difference in position in the embedding space 202 results in a different set of top k (where k=3) instances of closest anchor data 146. For example, the instance of embedding data 140(1) has top k 210(1) closest anchor embeddings 146(5), 146(2), and 146(6). Similarly, the instance of embedding data 140(3) has top k 210(3) closest anchor embeddings 146(2), 146(5), and 146(6).

As shown, in some implementations a plurality of instances of the stored data 180 associated with the embedding data 140 may have the same storage parameters 148. This may be used for storage and retrieval of information that is adjacent in the embedding space 202. For example, the query module 160 may use the storage parameters 148 determined from the query embedding data 162 to retrieve and decrypt a subset of the stored data 180 that is "nearest" in the embedding space 202. This reduces the computational resources associated with data retrieval and improves overall system efficiency.

In comparison, the instance of embedding data 140(2) happens to be relatively closer to its nearest instances of anchor data 146. The top k 210(2) closest instances of anchor data 146(6), 146(9), and 146(10) are much closer (in the embedding space) than the top k 210(1).

The parameter module 144 may use the top k 210 information as inputs to determine one or more storage parameters 148. For example, the set of top k anchor data 210 may be used as inputs to a cryptographic function and used to determine one or more cryptographic ("crypto") keys 232. In another example, the set of top k anchor data 210 may be used as input to a tokenization function and used to determine a token 234. In yet another example (not shown) the set of top k anchor data 210 may be used as input to a function that determines a data storage address.

The storage parameters 148 may be used by the storage module 142 to one or more of store or retrieve the stored data 180. The stored data 180 may comprise the input image data 112, secondary data, data based on the input image data 112, identification data 154, payment information, and so forth.

In some implementations the ordering of the top k anchor data 210 may be considered during processing by the parameter module 144. For example, top k anchor data 210(1) and 210(3) may result in different storage parameters 148 due to the difference in relative ordering of the anchor data 146. Some storage parameters 148 may be determined based on the anchor data 146 and the relative ordering, while other storage parameters 148 may disregard the relative ordering. For example, as shown in this implementation the crypto keys 232 may be determined based on the top k anchor data 210 and their relative ordering, resulting in different encryption keys associated with embedding data 140(1) and embedding data 140(3). In comparison, the tokens 234 are determined based on the top k anchor data 210 without regard to relative ordering, and so embedding data 140(1) and 140(3) share a common token 234.

In other implementations, different sets of top k anchor data 210 may be determined and used for one or more respective storage parameters 148. For example, the crypto key 232 may be determined based on the ordered list of top 10 closest anchor data 146, while the token 234 is determined based on the (non-ordered) list of top 3 closest anchor data 146.

Tabular data structures are described in this disclosure for ease of illustration and not as a limitation. It is understood that other data structures may be used.

Figure 3:
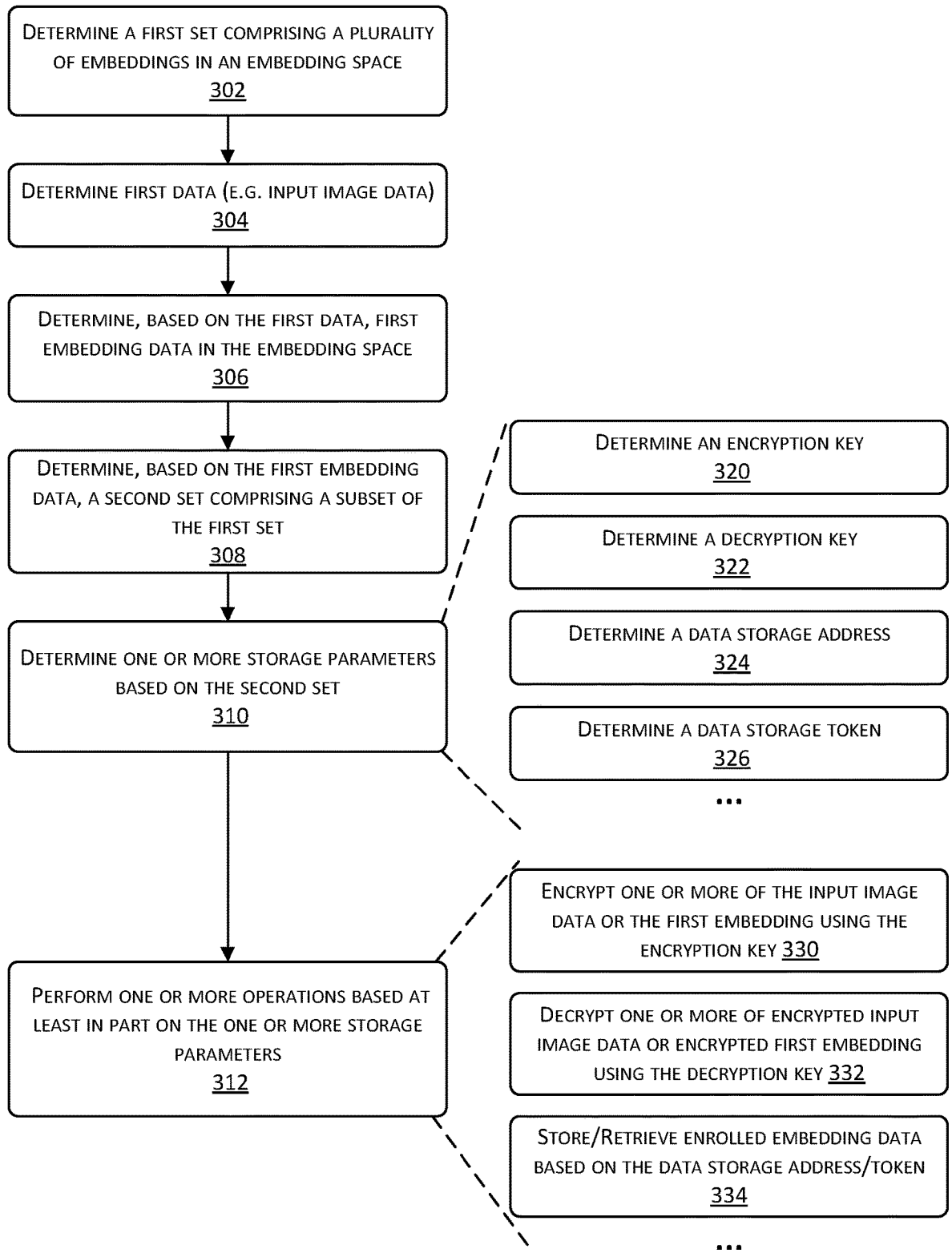
FIG. 3 illustrates a flow diagram of a process to determine storage parameters based on embedding data and perform operations based on those storage parameters, according to some implementations.

FIG. 3 illustrates a flow diagram 300 of a process to determine storage parameters 148 based on embedding data 140 and perform operations based on those storage parameters 148, according to some implementations. The process may be executed at least in part by one or more computing devices 118.

At 302 a first set is determined comprising a plurality of embeddings that are associated with a first embedding space 202. In one implementation, a portion of the training data 120 may be processed by the embedding network module 130 to determine the embedding data 140 that is used as the anchor data 146. The anchor data 146 may comprise a plurality of embeddings in the embedding space 202.

At 304, first data is determined. For example, the first data may comprise input image data 112. In another example, the first data may comprise audio data acquired using a microphone, radar data acquired by a radar sensor, and so forth.

At 306, based on the first data, first embedding data 140 is determined. For example, the first data may be provided as input to the trained embedding network module 130 that determines the first embedding data 140 in the embedding space 202.

At 308 based on the first embedding data 140, the system determines a second set comprising a subset of the first set. In one implementation, the second set may comprise, relative to the first embedding data 140, the top k closest embeddings of the first set. In some implementations k is a positive nonzero integer. In some implementations the second set may comprise the top k closest embeddings based on a Euclidean distance in the embedding space 202. In other implementations other functions may be used to determine the second set. For example, the second set may comprise a top k most similar embeddings of the first set. Continuing the example, similarity may be determined based on one or more of a comparison between the first embedding data 140 and at least a portion of the anchor data 146. In another example, the first embedding data 140 may be processed using a hash function, and the resulting hash value may be used to determine the second set.

At 310 one or more storage parameters 148 are determined based on the second set.

In one example shown at 320, the one or more of the embeddings of the anchor data 146 or the ordering of the embeddings in the second set may be provided as input to a function that determines an encryption key that is subsequently used to encrypt the stored data 180 while at rest.

In another example shown at 322, the one or more of the embeddings of the anchor data 146 or the ordering of the embeddings in the second set may be provided as input to a function that determines a decryption key.

In another example shown at 324, the one or more of the embeddings of the anchor data 146 or the ordering of the embeddings in the second set may be provided as input to a function that determines a data storage address.

In another example shown at 326, the one or more of the embeddings of the anchor data 146 or the ordering of the embeddings in the second set may be provided as input to a function that determines a data storage token.

At 312 one or more operations are performed based at least in part on the one or more storage parameters 148.

Continuing the earlier example at 320, at 330 the determined encryption key is used to encrypt the stored data 180 while at rest.

Continuing the earlier example at 322, at 332 the decryption key is used to decrypt the previously stored data 180 after retrieval.

Continuing the earlier examples at 324 or 326, at 334 the data storage address or the data storage token is subsequently used to store the stored data 180 or retrieve the stored data 180.

In some implementations the system 100 may be utilized in conjunction with homomorphic encryption. For example, the stored data 180 as previously encrypted may be retrieved based on the storage parameters 148. This encrypted stored data 180 may then be processed using one or more homomorphic cryptographic functions.

Figure 4:
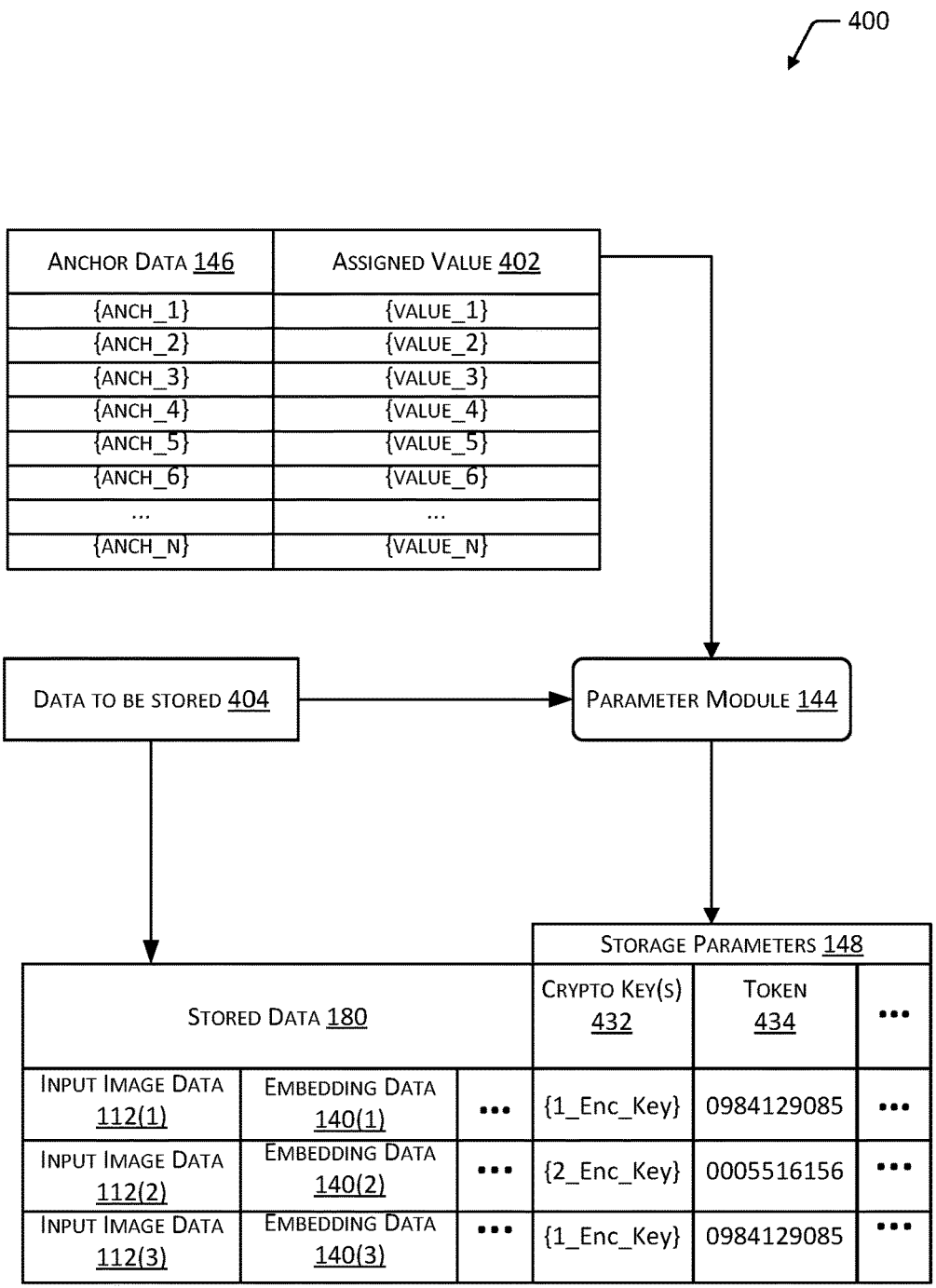
FIG. 4 illustrates a block diagram of assigned values associated with anchor data and corresponding storage parameters, according to some implementations.

FIG. 4 illustrates at 400 a block diagram of assigned values 402 associated with anchor data 146 and corresponding storage parameters 148, according to some implementations. In some implementations individual instances of anchor data 146, that is particular anchor embeddings, may be associated with assigned values 402. The assigned values 402 may be random or non-random values. During subsequent operation, the assigned values 402 may be used instead of or in addition to, the anchor embeddings. For example, instead of the anchor data 146 comprising anchor embeddings, the assigned values 402 may be provided to the parameter module 144. The data to be stored 404, or data based thereon, may also be provided as input to the parameter module 144. For example, in addition to or instead of the embedding network module 130, a module implementing one or more hash or other functions may be used to determine a value representative of the data to be stored 404.

The parameter module 144 may determine the storage parameters 148 that are associated with storage operations performed by the storage module 142 in association with the data to be stored 404. In some implementations, instead of top k anchor data 210, a set of k proximate entries may be determined. For example, the hash value of embedding data 140 may be used to specify a pointer value. Continuing the example a set of k proximate entries may comprise the k entries in a sorted list of assigned values 402, with proximity determined by the entries in the sorted list that begin at the pointer value. In other implementations other techniques may be used.

Figure 5:
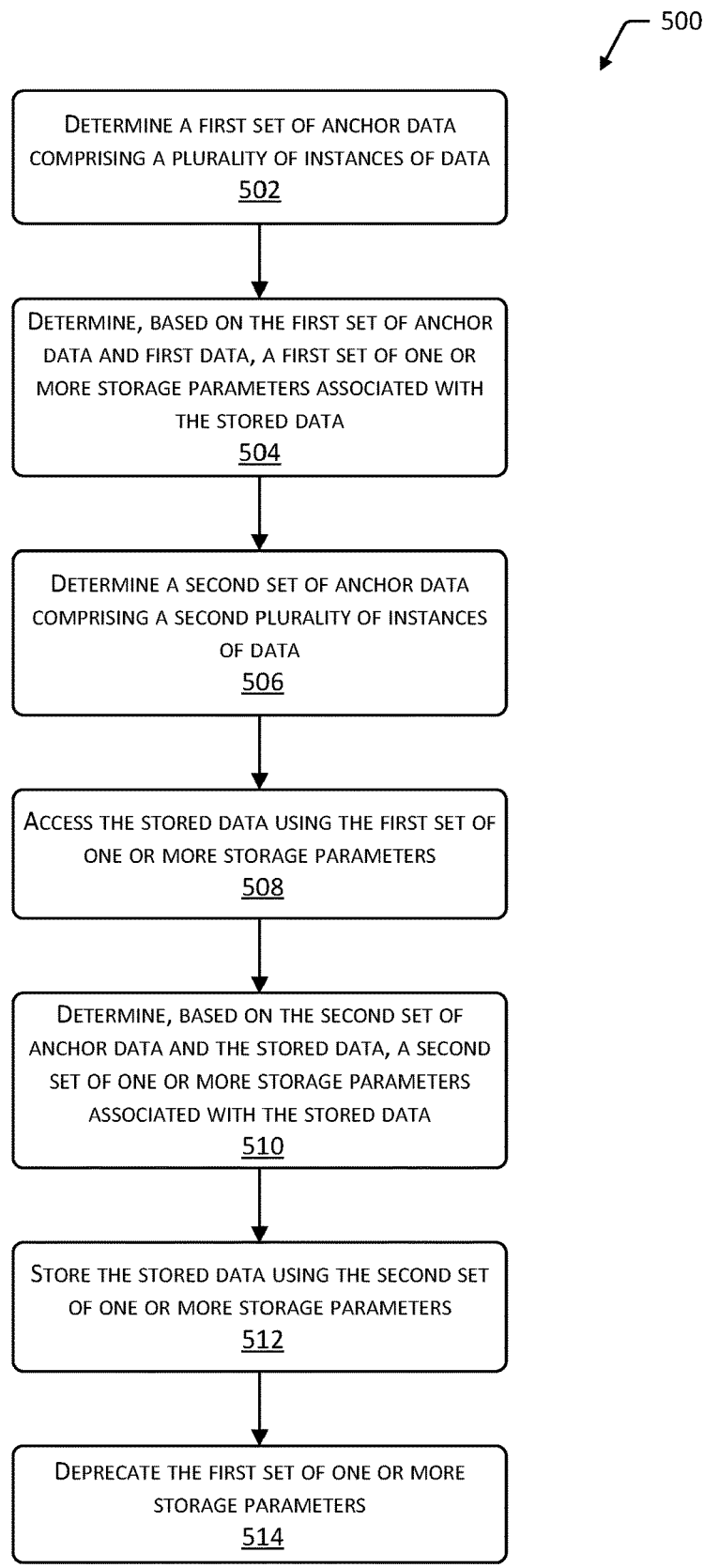
FIG. 5 illustrates a flow diagram of a process to modify the storage parameters associated with previously stored data, according to some implementations.

FIG. 5 illustrates a flow diagram 500 of a process to modify the storage parameters 148 associated with previously stored data 180, according to some implementations. The process may be executed at least in part by one or more computing devices 118.

In some scenarios, it may be advantageous to modify the storage parameters 148. For example, in the event of a suspected security compromise, it may be advantageous to deprecate existing anchor data 146 and transition to utilizing different anchor data 146. By performing this modification, the potentially compromised information, such as cryptographic keys 432, data storage addresses, data storage tokens 434, and so forth are rendered unusable, improving overall security of the system.

In some situations, the modification of the storage parameters 148 may be performed on an ad hoc basis, on a regular periodic schedule, or on an irregular schedule.

At 502 a first set of anchor data 146 comprising a plurality of instances of data is determined. For example, the first set of anchor data 146 may comprise a first plurality of anchor embeddings in the embedding space 202.

At 504, based on the first set of anchor data 146 and first data, a first set of one or more storage parameters 148 associated with the stored data 180 are determined. For example, the first data may comprise embedding data 140.

At 506 a second set of anchor data 146 comprising a second plurality of instances of data is determined. For example, the second set of anchor data 146 may comprise a second plurality of anchor embeddings in the embedding space 202, different from the first plurality of anchor embeddings.

At 508 the stored data 180 is accessed using the first set of one or more storage parameters 148.

At 510, based on the second set of anchor data 146 and the stored data 180, a second set of one or more storage parameters 148 are determined that are associated with the stored data 180.

At 512 the stored data 180 is stored based on the second set of one or more storage parameters 148.

At 514 the first set of one or more storage parameters 148 may be deprecated. In some implementations, the first set of anchor data 146 may also be deprecated. Once deprecated, data may be erased.

Figure 6:
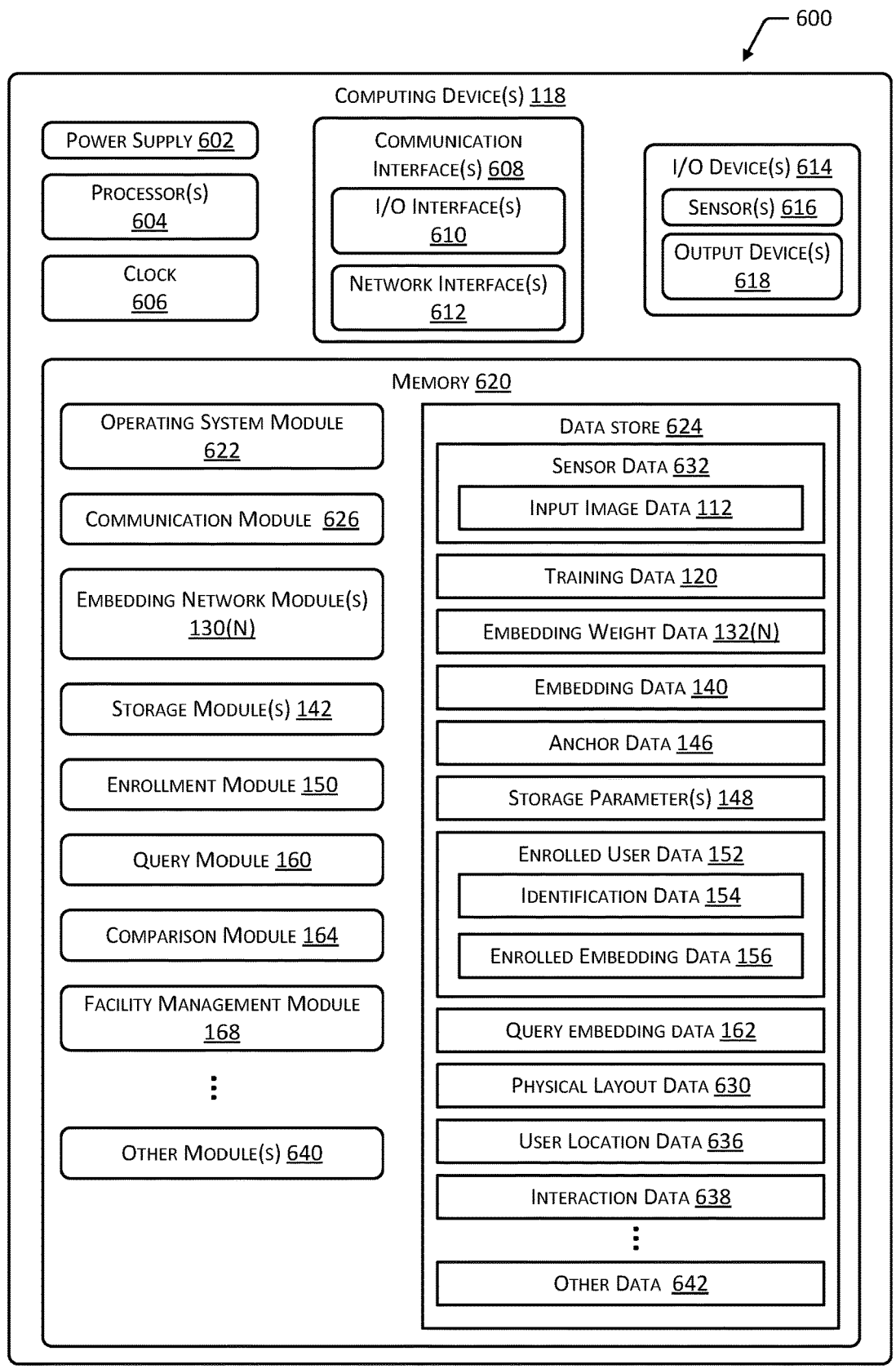
FIG. 6 is a block diagram of a computing device to implement the system, according to some implementations.

FIG. 6 is a block diagram 600 of a computing device 118 to implement the system 100 or a portion thereof, according to some implementations.

The computing device 118 may be within the scanner 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (Saas)", "platform computing", "network-accessible platform", "cloud services", "data centers", and so forth. Services provided by the computing device 118 may be distributed across one or more physical or virtual devices.

One or more power supplies 602 may be configured to provide electrical power suitable for operating the components in the computing device 118. The one or more power supplies 602 may comprise batteries, capacitors, fuel cells, photovoltaic cells, wireless power receivers, conductive couplings suitable for attachment to a power source such as provided by an electric utility, and so forth. The computing device 118 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 118 may include one or more communication interfaces 608 such as input/output (I/O) interfaces 610, network interfaces 612, and so forth. The communication interfaces 608 enable the computing device 118, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 118 or may be externally placed. The sensors 616 may comprise the camera 108, smartcard readers, touch sensors, microphones, and so forth.

The network interfaces 612 may be configured to provide communications between the computing device 118 and other devices, such as routers, access points, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 6, the computing device 118 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 118. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 626 may be configured to establish communications with the computing device 118, servers, other computing devices 118, or other devices. The communications may be authenticated, encrypted, and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including other computing devices 118, network attached storage devices, and so forth.

The data store 624 may store one or more of the training data 120, embedding weight data 132, anchor data 146, stored data 180 such enrolled user data 152, enrolled embedding data 156, and so forth. The memory 620 may store the embedding network module 130, the storage module 142, the enrollment module(s) 150, the query module 160, the comparison module 164, the facility management module 168, and so forth.

In some implementations, the input image data 112 may be temporarily stored during processing by the embedding network module 130. For example, the scanner 104 may acquire the input image data 112, determine the embedding data 140 based on the input image data 112, and then erase the input image data 112. The resulting embedding data 140 may then be sent to a server or other computing device 118 to perform enrollment, for comparison to assert an identity, and so forth.

The embedding network module 130 may determine the embedding data 140(N) based on input image data 112. The parameter module 144 of the storage module 142 may access the anchor data 146 and use the embedding data 140 to determine one or more storage parameters 148.

As described above, the enrollment module 150 may be used to perform an enrollment process in which enrolled embedding data 156 is acquired and associated with identification data 154.

During a query, query input image data may be provided to the embedding network module 130 that determines query embedding data 162. The query module 160 may accept as input query embedding data 162 and use the comparison module 164 to determine if the query embedding data 162 corresponds to previously stored enrolled embedding data 156. For example, the query module 160 may determine if a distance between the query embedding data 162 and the enrolled embedding data 156 is less than a threshold distance in the embedding space 202. If so, the identification data 154 associated with the enrolled embedding data 156 may be asserted to the query input image. The comparison module 164 may use a variety of techniques to determine if query embedding data 162 is associated with enrolled user data 152.

The facility management module 168 may perform various functions, such as tracking items between different inventory locations, to and from carts, generating restocking orders, directing operation of robots within the facility, using the asserted identification data 166 to associate a particular user identity with a user in the facility, and so forth. During operation, the facility management module 168 may access sensor data 632 such as input image data 112, or data from other sensors.

Information used by the facility management module 168 may be stored in the data store 624. For example, the data store 624 may be used to store physical layout data 630, sensor data 632, asserted identification data 166 (not shown), user location data 636, interaction data 638, and so forth. For example, the sensor data 632 may comprise the input image data 112 obtained from a scanner 104 associated with the facility.

The physical layout data 630 may provide information indicative of where scanners 104, cameras, weight sensors, antennas for radio receivers, inventory locations, and so forth are within the facility with respect to one another. For example, the physical layout data 630 may comprise information representative of a map or floor plan of the facility with relative positions of gates with scanners 104 and inventory locations.

The facility management module 168 may generate the user location data 636 that is indicative of the location of the user within the facility. For example, the facility management module 168 may use image data obtained by the cameras to determine a location of the user. In other implementations, other techniques may be used for determining the user location data 636. For example, data from a smart floor may be used to determine the location of the user.

The identification data 154 may be associated with user location data 636. For example, the user enters the facility and has their hand 102 scanned by the scanner 104, resulting in asserted identification data 166 that is associated with their time of entry and the scanner 104 location. The user location data 636 indicative of a path of a user that begins at the scanner 104 location at the time of entry may be associated with the user identifier in the asserted identification data 166.

Based on the user location data 636 and the interaction data 638, a particular interaction may be associated with an account of a particular user. For example, if the user location data 636 indicates that the user is present in front of inventory location 692 at time 09:02:02 and the interaction data 638 indicates a pick of a quantity of one item from an area on inventory location 692 at 09:04:13, the user may be billed for that pick.

The facility management module 168 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 168 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 168 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the asserted identification data 166 to bill an account associated with a particular user.

The devices and techniques described in this disclosure may be used in a variety of other settings. For example, the system 100 may be used in conjunction with a point-of-sale (POS) device. The user may present their hand 102 to a scanner 104 to provide an indication of intent and authorization to pay with an account associated with the asserted identification data 166. In another example, a robot, kiosk, or other device may incorporate a scanner 104. The device may use the asserted identification data 166 to determine whether to deliver a parcel to the user, and based on the asserted identification data 166, which parcel to deliver.

While the input to the system 100 is discussed with respect to image data, the system may be used with other types of input. For example, the input may comprise data acquired from one or more sensors 616, data generated by another system, and so forth. For example, instead of image data produced by the camera 108, the input to the system 100 may comprise an array of data. In other examples, the input to the system 100 may comprise one or more of audio data, point cloud data, and so forth. Other modalities may also be used. For example, the first modality may be visible light, the second modality may be sonar, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a memory, storing first computer-executable instructions; and
   a hardware processor to execute the first computer-executable instructions to:
   determine a first set of anchor data comprising a plurality of biometric input data;
   determine a plurality of anchor embeddings using the first set of anchor data as input to a first trained embedding network module, wherein the plurality of anchor embeddings are associated with a first embedding space;
   determine input image data of a hand, wherein the input image data comprises surface and subcutaneous features of the hand;
   determine first embedding data using the input image data as input to the first trained embedding network module, wherein the first embedding data is associated with the first embedding space;
   determine, relative to the first embedding data, a first set of top k closest anchor embeddings wherein k is a positive nonzero integer;
   determine a first cryptographic key based on the first set of top k closest anchor embeddings;
   encrypt the input image data using the first cryptographic key to determine encrypted input image data; and
   store the encrypted input image data.

2. The system of claim 1, further comprising instructions to:
   determine identification data associated with a first user, wherein the input image data is representative of the first user; and
   associate the identification data with the encrypted input image data.

3. The system of claim 1, further comprising instructions to:
   determine query input image data;
   determine second embedding data using the query input image data as input to the first trained embedding network module;
   determine, relative to the second embedding data, a second set of top k closest anchor embeddings;
   determine the first cryptographic key based on the second set of top k closest anchor embeddings;
   decrypt the encrypted input image data using the first cryptographic key to determine decrypted input image data;
   determine third embedding data using the decrypted input image data as input to the first trained embedding network module; and
   determine identification data based on a comparison of the second embedding data and the third embedding data.

4. A system comprising:
   a memory, storing first computer-executable instructions; and
   a hardware processor to execute the first computer-executable instructions to:
   determine a first set comprising a plurality of embeddings that are associated with a first embedding space;
   determine first data;

determine first embedding data using the first data as input to a first trained embedding network module, wherein the first embedding data is associated with the first embedding space;

determine, based on the first embedding data, a second set comprising a subset of the first set;

determine one or more storage parameters based on the second set; and perform one or more operations based at least in part on the one or more storage parameters.

5. The system of claim 4, the instructions to determine the second set further comprising instructions to:

determine a top k closest embeddings of the first set that are less than a maximum distance in the first embedding space from the first embedding data.

6. The system of claim 4, wherein the one or more storage parameters comprise one or more cryptographic keys.

7. The system of claim 4, wherein the one or more operations comprise one or more of:

encryption of the first data, encryption of the first embedding data, decryption of previously stored and encrypted data, or decryption of previously stored and encrypted embedding data.

8. The system of claim 4, wherein the one or more storage parameters comprise a data storage address.

9. The system of claim 4, wherein the one or more operations comprise one or more of:

storage of the first data, storage of the first embedding data, retrieval of previously stored second data, or retrieval of previously stored embedding data.

10. The system of claim 4, wherein the one or more storage parameters comprise a data storage address and a cryptographic key, and the one or more operations comprise:

retrieval, using the data storage address, of a plurality of one or more of:

previously stored encrypted biometric data, or previously stored encrypted embedding data; and decryption, using the cryptographic key, of a plurality of one or more of:

the previously stored encrypted biometric data, or the previously stored encrypted embedding data.

11. The system of claim 4, wherein the first data comprises biometric input associated with a user.

12. The system of claim 4, further comprising instructions to:

determine a first set of input data, wherein at least a portion of the first set of input data comprises synthetic data; and determine the first set by processing the first set of input data using the first trained embedding network module.

13. A method comprising:

determining a first set comprising a plurality of embeddings that are associated with a first embedding space;

determining first data;

determining first embedding data using the first data as input to a first trained embedding network module, wherein the first embedding data is associated with the first embedding space;

determining, based on the first embedding data, a second set comprising a subset of the first set;

determining one or more storage parameters based on the second set; and performing one or more operations based at least in part on the one or more storage parameters.

14. The method of claim 13, wherein the second set comprises top k closest embeddings of the first set that are less than a maximum distance in the first embedding space from the first embedding data.

15. The method of claim 13, wherein the one or more storage parameters comprise a cryptographic key.

16. The method of claim 13, wherein the one or more operations comprise one or more of:

encrypting the first data, encrypting the first embedding data, decrypting previously stored and encrypted data, or decrypting previously stored and encrypted embedding data.

17. The method of claim 13, wherein the one or more storage parameters comprise a data storage address.

18. The method of claim 13, wherein the one or more operations comprise one or more of:

storing the first data, storing the first embedding data, retrieving previously stored second data, or retrieving previously stored embedding data.

19. The method of claim 13, wherein the one or more storage parameters comprise a data storage address and a cryptographic key, and the one or more operations comprising:

retrieving, using the data storage address, a plurality of one or more of:

previously stored encrypted biometric data, or previously stored encrypted embedding data; and decrypting, using the cryptographic key, a plurality of one or more of:

the previously stored encrypted biometric data, or the previously stored encrypted embedding data.

20. The method of claim 13, further comprising:

determining a set of data, wherein at least a portion of the set of data comprises synthetic data; and determining the first set by processing the set of data using the first trained embedding network module.

* * * * *